Figure 1:
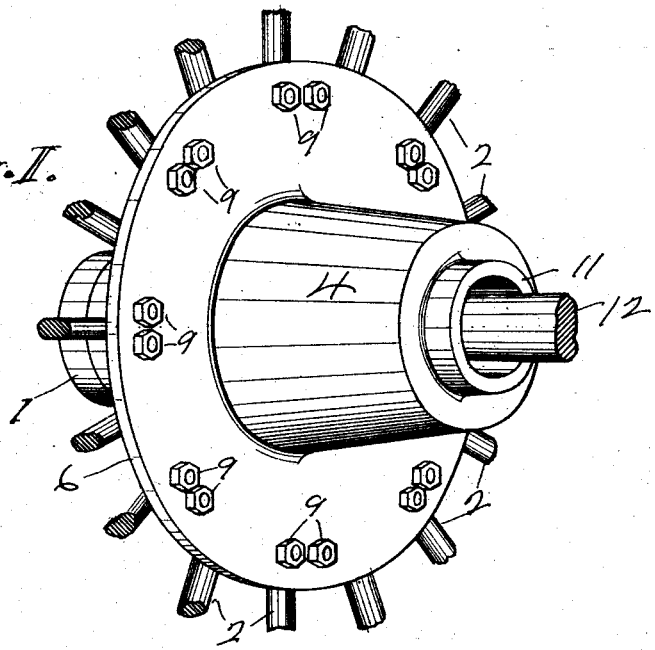

W. H. McDOWELL.
MOTOR VEHICLE WHEEL.
APPLICATION FILED JAN. 13, 1908.

907,268.

Patented Dec. 22, 1908.

WITNESSES:
Augusta Viberg.
Auguste Spiegel.

Willis H. McDowell INVENTOR
BY Chapin & Denny
his ATTORNEYS

UNITED STATES PATENT OFFICE.

WILLIS H. McDOWELL, OF AUBURN, INDIANA.

MOTOR-VEHICLE WHEEL.

No. 907,268.  Specification of Letters Patent.  Patented Dec. 22, 1908.

Application filed January 13, 1908. Serial No. 410,544.

*To all whom it may concern:*

Be it known that I, WILLIS H. MCDOWELL, a citizen of the United States, residing at Auburn, in the county of Dekalb, in the State of Indiana, have invented certain new and useful Improvements in Motor-Vehicle Wheels; and I do hereby declare that the following is a full, clear, and exact description of the invention, which will enable others skilled in the art to which it appertains to make and use the same, reference being had to the accompanying drawings, which form part of this specification.

My invention relates to improvements in motor vehicle wheels, specially designed and adapted for the driving wheels.

It is well known that in that class of motor vehicles known as "auto-buggies," there is in use a severe, racking torsional strain on the wheel hub, and also a severe lateral and loosening strain on the tenons of the spokes.

The prime object, therefore, of my present invention is to provide a motor vehicle wheel having an improved reinforcing means adapted to relieve the hub of all torsional strains in use, and also to relieve the tenons of the spokes of the usual lateral strains which soon loosen the spokes and thereby weaken and derange the wheel.

My invention consists of a metallic thimble adapted to loosely inclose the inner end of the hub, and having upon its inner end an upright circular flange adapted to be rigidly fixed to the spokes at or near their inner end, and provided with a concentric integral sleeve in which the adjacent end of the axle is firmly fixed.

The novel feature of my invention resides in the construction and relative arrangement of the hub reinforcing means by which the said deranging strains are obviated.

Similar reference numerals indicate like parts in the several views of the drawings in which—

Figure 2:
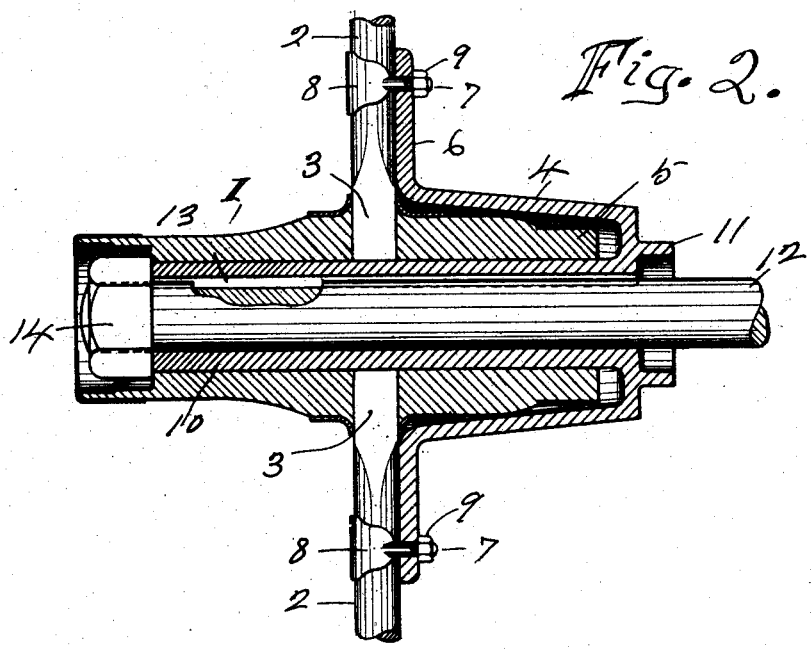

Figure 1 is a perspective view of a motor vehicle wheel partly broken away, with my invention in position thereon, looking toward the inner end of the hub. Fig. 2 is a longitudinal central section of Fig. 1 showing the relative arrangement of the co-acting parts, and the means for securing the same in position.

The wheel for which my invention is adapted is of the usual Sarven type or other proper construction of buggy wheel having a common form of hub 1 and spokes 2. The latter have the usual construction and arrangement of tenons 3 firmly fixed as usual in suitable radial hub openings, as shown in Fig. 2.

The thimble 4, preferably tapering, as shown, and of suitable metal is adapted to loosely inclose the inner end 5 of the hub, and has a substantially right angular circular flange 6 provided with a series of lateral perforations arranged in pairs, adapted to contain the outer ends 7 of the respective clips 8 which are arranged to snugly fit and firmly embrace each alternate spoke 2 near its inner end as shown in Fig. 2. These clips are rigidly secured in position by means of the threaded nuts 9. The thimble 4 is also provided with the concentric integral sleeve 10 which is adapted to be arranged in the hollow interior of the hub, and extends nearly to the outer end thereof, and is so arranged that the inner end of the hub is contained between the sides of the thimble and the sleeve. This sleeve may be attached to the inner end of the thimble instead of being integral, if desired. The thimble 4 is also provided upon its inner end with the short longitudinal annular flange 11 which serves as a dust protector for the bearing, not shown.

The axle 12 passes through the sleeve 10 and is rigidly fixed therein by means of a suitable key or spline adapted to be inserted in the key-way 13 consisting of two coincident longitudinal slots, one in the sleeve 10 and the other in the shaft 12.

The wheel thus constructed is further secured in position on the axle by means of any proper axle nut 14 on the usual form of reduced screw-threaded end of the axle, not shown.

The operation of my invention thus described is obvious, and briefly stated is as follows: In use my invention is mounted on the wheel by slipping it over the inner end of the hub at the same time passing the integral sleeve 10 into the hub opening, after which it is rigidly keyed on the axle as described. The operator then rigidly secures the flange 6 to the spokes and against the inner face thereof by means of the clip 8, as described. While these clips are preferably arranged to embrace every alternate spoke such arrangement is immaterial, as they may be arranged to embrace each one of the spokes or any lesser number desired. The wheel is then secured in position by means of the nut 14. It is evident that all torsional strain from the revolving axle is received by the metallic sleeve instead of by the hub, and that whatever lateral strain, if any, is received by the spokes will not be transmitted to the tenons, or have any appreciable tendency to loosen the spokes in the hub.

While my hub reinforcing means is specially designed for the rear or driving wheels of the vehicle, it is also equally adapted for use in the same manner on the front wheels thereof. When, however, my invention is employed upon the front wheels the sleeve is provided with and connected to the shaft by a roller bearing instead of being keyed to the shaft.

Obviously the sleeve 10 may be materially shortened or even entirely dispensed with, if desired, though it is preferably employed. The sleeve 4 may be arranged to inclose the outer instead of the inner end of the hub, and it may even be duplicated if desired, and be made to inclose both ends of the hub without departing from the spirit and scope of my invention which consists of an attachment for either end of the hub of a motor-vehicle wheel adapted to relieve the hub and spoke tenons of the torsional and lateral strains incident to use.

Having thus described my invention and the manner of employing the same what I desire to secure by Letters Patent is:

1. A hub attachment for motor vehicle wheels, consisting of a thimble supported upon the axle by means of an inner concentric sleeve, and provided upon its inner end with an annular flange, and means for securing the said flange to the spokes beyond and independently of the wheel hub.

2. In a motor vehicle wheel a hub attachment consisting of a cylindrical sheath for one end of the hub, and a concentric sleeve inclosing the axle and in fixed relation therewith, the sheath being rigidly connected to the spokes of the wheel beyond the tenons and independently of the hub, for the purpose described.

3. In a vehicle wheel of the Sarven type, a sheath adapted to inclose one end of the hub, and to be rigidly secured to the wheel spokes independently of the hub, and provided with a concentric outwardly extending sleeve interposed between the hub and the axle and adapted to be supported by the axle.

4. A motor vehicle wheel having a reinforcing attachment consisting of a thimble or sheath inclosing one end of the hub, and provided with means for supporting it upon the axle; and means for rigidly securing the thimble to the wheel spokes beyond and independently of the hub.

5. A hub attachment for reinforcing motor vehicle wheels, consisting of a thimble adapted to inclose the inner end of the hub, and having its inner end closed and provided with a dust shield, the said thimble being attached to the wheel spokes at its open end independently of the hub, and provided with means for supporting the same upon the concentric axle, all substantially as described.

Signer by me at Auburn, Dekalb county, State of Indiana, this 8" day of January, A. D. 1908.

WILLIS H. McDOWELL.

Witnesses:
W. M. HINES,
WELLIS RHOADS.